Sept. 10, 1929.  W. BURSTYN  1,728,038
AUTOMATIC CIRCUIT CONTROLLER
Filed Aug. 2, 1923
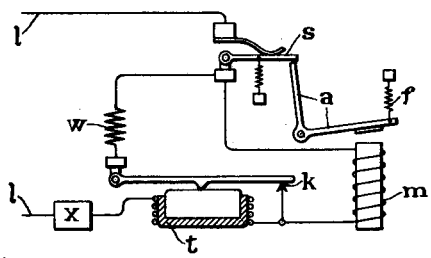
Fig. 1.
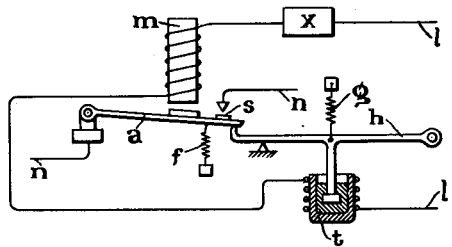
Fig. 4.
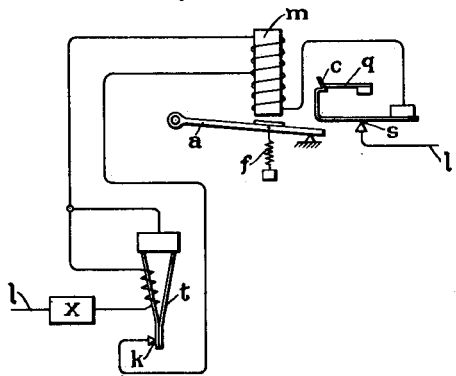
Fig. 2.
Fig. 3.
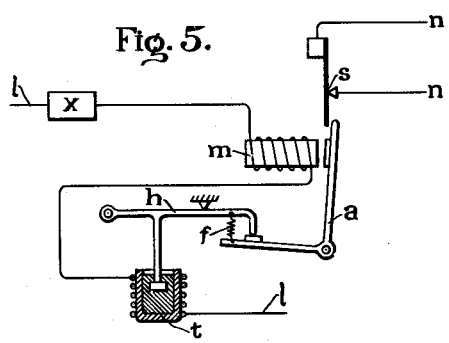
Fig. 5.
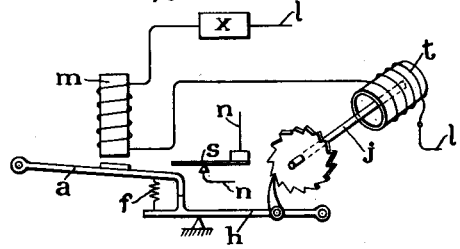
Fig. 6.
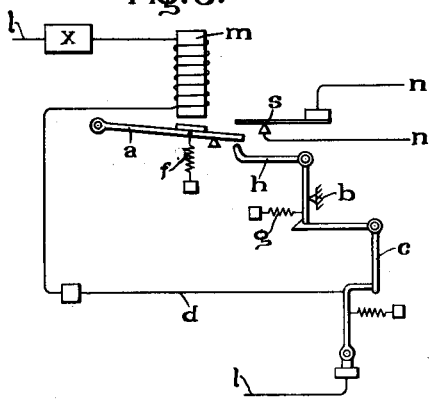
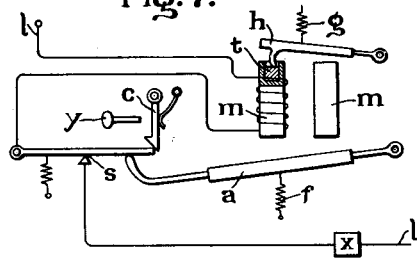
Fig. 7.
Inventor:
Walther Burstyn,
by *(signature)*
His Attorney.

Patented Sept. 10, 1929.

1,728,038

UNITED STATES PATENT OFFICE.

WALTHER BÜRSTYN, OF BERLIN-WILMERSDORF, GERMANY, ASSIGNOR TO GENERAL ELECTRIC COMPANY, A CORPORATION OF NEW YORK.

AUTOMATIC CIRCUIT CONTROLLER.

Application filed August 2, 1923, Serial No. 655,378, and in Germany August 14, 1922.

My invention relates to an automatic circuit controller for protecting a controlled circuit from abnormal conditions, such for example as overloads, whether the overload be of an instantaneous character and of such a high value that the controlled circuit should be opened very quickly upon the occurrence of the overload, or the overload be comparatively small but of such a duration that the controlled circuit should be opened after a time interval to prevent overheating of the translating device or devices included in the controlled circuit.

An object of the invention is to provide an improved controller of the nature set forth, so that in all cases the controlled circuit will be quickly opened at the proper time.

In carrying my invention into effect, I provide an electromagnet which operates to open the controlled circuit and is arranged so as to normally operate in response to an overload of a comparatively high value, and alter the normal operation of the electromagnet by a thermal responsive device which is heated responsively to the current in the controlled circuit so that the operation of the electromagnet takes into account the thermal condition of the translating device or devices included in the controlled circuits which are to be protected.

For a better understanding of the invention, reference is had to the accompanying drawings wherein Fig. 1 is a very diagrammatic representation of a controller with its connections in accordance with the invention, and in which the thermal responsive device operates to open a shunt circuit about the coil of the electromagnet which effects the interruption of the controlled circuit; Fig. 2 is a similar diagram employing a bi-metallic thermostatic device arranged to open a shunt circuit about a portion of the winding of the electromagnet; Fig. 3 is a modification in which the thermal responsive device takes the form of a hot wire which controls a detent which in turn controls the operation of the magnetic movable member of the electromagnet; Fig. 4 is a further modification in which the thermal responsive device takes the form of an element which is fused in response to the heating effect of the current in the controlled circuit, and this fusible element controls the position of the magnetic movable member of the electromagnet; Fig. 5 is a modification of the arrangement of Fig. 4 with a different form of connections between the fusible elements and the magnetic movable member of the electromagnet; Fig. 6 is an arrangement similar to Fig. 5 with the exception that the fusible element controls a ratchet and pawl arrangement which in turn controls the magnetic movable member of the electromagnet; and Fig. 7 shows an arrangement in which the fusible element is arranged so as to control the magnetic reluctance of the electromagnet to thereby alter the value of current at which the electromagnet operates. The arrangement is also such that the device may be manually reset.

Throughout the drawings similar reference characters designate similar or substantially similar parts. Referring to Fig. 1, the winding $m$ of the electromagnet has a resistance $w$ connected in parallel therewith through the switch $k$ which is normally closed, so that normally only a portion of the current in the controlled circuit flows through the magnet winding, and the armature $a$ which controls the switch member $s$ is attracted only in case of a comparatively great overload. The thermal responsive device $t$ is included in the circuit $l\ l$ to be controlled and this device controls the switch $k$ to thereby control the shunt about the magnet winding. The thermal responsive device may be of the type in which a container filled with vaporizing liquid is surrounded by a heating winding which heats a liquid and after a time interval effects the opening of the switch $k$. Thermal responsive devices of this general nature are well known to those skilled in the art, and the device is therefore illustrated very diagrammatically for the sake of simplicity of the drawing. The operation of this arrangement with the parts in their respective positions shown in the drawing is briefly as follows: In case the current in the controlled circuit exceeds a predetermined value, sufficient current will flow through the winding $m$ of the electromagnet to attract the magnetic movable member $a$ against the bias of the spring $f$ so as to thereby permit the switch member $s$ to automatically open in accordance with its bias. This will take care of momentary or other overloads of a comparatively high value. In case the overload is of a comparatively low value such that the circuit would not normally be opened by the electromagnet and this overload continues for a predetermined interval of time, the thermal responsive device $t$ will be heated by the current in the control circuit so as to thereby volatilize the liquid and open the switch $k$. The multiple circuit including the resistance $w$ is thereby opened, and the energization of the winding $m$ is thereby increased so that the armature or magnetic movable member $a$ will be very quickly attracted and the controlled circuit very quickly opened. It will thus be seen that the electromagnet serves at all times to effect the interruption of the controlled circuit, and that in case the overload is of a sufficiently high value the electromagnet will be energized to open the controlled circuit practically instantaneously, but that in case the overload is of a comparatively small value and continues for a certain time interval, the electromagnet will nevertheless be effective to open the controlled circuit. The thermal responsive device therefore alters the operation of the electromagnetic opening device so as to take into account the thermal condition of the translating device or devices included in the controlled circuit. The thermal responsive device may be designed so as to have substantially similar thermal characteristics to the translating device or devices (not shown) included in the controlled circuit, so that overloading of the translating device is thus protected against.

In the arrangement of Fig. 2, the thermal responsive device takes the form of a bi-metallic thermostatic element which is heated in accordance with the current in the controlled circuit and which is arranged to deflect to thereby open a shunt circuit about the portion of the winding $m$ of the electromagnet at the contacts $a$. The operation of the arrangement is essentially the same as that of Fig. 1. The magnetic movable member $a$ will be energized to operate the switch member $s$ to thereby open the controlled circuit in case the overload is of a comparatively high value, and in case the overload is of a comparatively low value which persists for a predetermined interval of time, the shunt circuit about the portion of the winding of the electromagnet is opened at the thermally controlled contacts. The magnetic flux of the electromagnet is thereby increased so as to effect the opening of the controlled circuit. The hook $c$ is arranged to catch on the fixed stop $q$ so as to hold the switch member in the controlled circuit in the open position. This is provided for insuring that after the controlled circuit is opened either in response to an instantaneous overload of high value or of a comparatively small overload which persists for a predetermined length of time, the controlled circuit will not be again reclosed after opening until the operator intends that it shall be closed.

In the arrangement of Fig. 3 the thermal responsive device takes the form of a hot wire $d$ which is included in the controlled circuit, and the controller governs the switch contacts included in a circuit $n$ $n$. The circuit $n$ $n$ may be the circuit of the no-voltage release electromagnet of an automatic circuit breaker, so that the controller in accordance with the invention operates as a relay and no voltage protection is secured as well as protection from overloads. It is believed that an understanding of this arrangement will be readily had from a description of the operation. In case the overload is of a comparatively high value, the electromagnet $m$ will be sufficiently energized to attract its magnetic movable member $a$ to thereby interrupt the controlled contacts $s$. If the overload is of a comparatively small value and persists for a predetermined length of time sufficiently to heat the hot wire $d$ and thereby cause the same to be elongated, the catch $c$ will move out of engagement with the one end of the lever $h$ and this lever will be released so as to move in accordance with the bias of the spring $g$ and thereby bring the armature or magnetic movable member $a$ nearer the end of the pole of the electromagnet so that this armature will be attracted by the electromagnet at a smaller value of current and thereby effect the interruption of the controlled circuit $n$ $n$.

In Fig. 4 the arrangement is essentially the same as that of Fig. 3 with the exception that the thermal responsive device $t$ included in the circuit $l$ $l$ takes the form of an element which is fused in accordance with the heating of the current in the controlled circuit so as to thereby release the lever $h$ to move in accordance with the bias of the spring $g$ and thus move the armature $a$ nearer the pole of the electromagnet so that the electromagnet will attract the armature and close the switch $s$. The switch $s$ may be arranged to control the circuit of a tripping coil of an automatic circuit breaker for the purpose of interrupting the controlled circuit $l$ $l$ in accordance with the abnormal conditions occurring in this circuit.

In Fig. 5 the springs $g$ and $f$ of the arrangement of Fig. 4 are combined to form a single spring $f$ which biases the one end of the armature and the one end of the lever $h$ into engagement with each other. It is believed that the operation of this arrangement will be apparent to those skilled in the art from an understanding of the invention as described in connection with the previous figures. The thermal responsive device $t$ may take the form of a vessel which is filled with an easily fused metal, and a heating winding included in the controlled circuit is arranged to fuse the metal when the critical temperature has been reached. As long as the metal is in a solid condition, the lever $h$ is locked against movement, but when the metal melts, the lever $h$ is released and thus presses on the armature lever $a$ and effects the interruption of the switch $s$. The switch $s$ may be included in the no-voltage release electromagnet circuit of an automatic circuit breaker.

The thermal responsive device of Fig. 6 takes the form of a vessel in which a shaft $j$ is adapted to rotate when the contents, consisting of an easily melted metal, melts and permits the shaft to be rotated in accordance with the strain of the spring $f$ acting through the lever $h$ and the pawl and ratchet mechanism shown. The arrangement will be such that the pawl will operate the ratchet mechanism to such a position that when the armature $a$ is released by the electromagnet, the pawl will drop into the next succeeding ratchet tooth and be thus ready for the next operation. It is believed that the operation of this arrangement will be apparent to those skilled in the art from an understanding of the operation of the arrangement of the previous figures.

In the arrangement of Fig. 7, the thermal responsive device and the electromagnet for operating the switch member to interrupt the controlled circuit are combined so that the winding of the electromagnet serves as the heating winding of the thermal responsive device. In this arrangement the thermal responsive device may take the form of an easily fusible metal which when it melts will release the lever $h$ to fall and thereby decrease the magnetic reluctance of the electromagnet. Decreasing the magnetic reluctance of the electromagnet will intensify the pull thereof and thus cause the armature $a$ to be attracted and thus quickly open the switch $s$ included in the controlled circuit. When the switch $s$ is opened, the switch member is caught by the spring-pressed detent or catch $c$ so that the controlled circuit is not automatically reclosed. The levers $h$ and the armature $a$, however, return to their original positions. The controlled circuit may be closed at the will of the operator by pressing on the push button $y$ so as to release the pawl $c$. It will be understood that in case the overload is of a sufficiently high value, the electromagnet will directly operate the switch member to interrupt the controlled circuit in the manner previously explained in connection with the other figures.

It is not necessary in accordance with the invention that the thermal responsive device exactly follow the heating characteristics of the translating device or devices included in the controlled circuit, although for certain application this is desirable. For certain other applications it is merely sufficient that the thermal responsive device shall have a time constant which is slightly smaller than the time constant of the heating of the translating device or devices to be protected so that the protection afforded is on the safe side.

In accordance with the provisions of the patent statutes, I have described the principle of operation of my invention, together with the apparatus which I now consider to represent the best embodiment thereof, but I desire to have it understood that the apparatus shown is only illustrative, and that the invention may be carried out by other means.

What I claim as new and desire to secure by Letters Patent of the United States, is,—

1. A circuit controller comprising a movable switch member, an electromagnet connected to be energized responsively to the current in the circuit controlled by the switch and normally arranged to effect the operation of said switch member in response to a predetermined value of current in the circuit controlled by the switch, a thermal responsive device connected to be heated in accordance with the current in the controlled circuit, and means whereby said thermal responsive device controls the energizing circuit of the said electromagnet to effect the operation of said switch member at a different value of current in the circuit controlled by the switch.

2. A circuit controller comprising a movable switch member, an electromagnet energized responsively to the current in the circuit controlled by the switch and having a movable magnetic member operable through a fixed distance for operating the said switch member in response to a comparatively large overload in the controlled circuit, a thermal responsive device connected to be heated in accordance with the current in the controlled circuit, and connections whereby the said thermal device alters the value of current in the controlled circuit at which the said electromagnet operates the said movable magnetic member through said distance to effect operation of the said switch member in accordance with the heating effect of the current in the controlled circuit.

3. A circuit controller comprising a movable switch member biased to the circuit closing position, an electromagnet for operating the said switch member to the open circuit position in response to abnormal current conditions in the circuit controlled by the switch, a thermal responsive device connected to be heated in accordance with the current in the controlled circuit and connections whereby the said thermal device varies the value of current at which the said electromagnet operates the said switch member to the open circuit position.

4. An overload circuit breaker comprising an electromagnet having a magnetic movable member biased to one position and a winding energized responsively to the current in the circuit controlled by the switch for controlling the movement of said magnetic member to a second position, a movable switch member controlled by the said magnetic member in said secured position to protect the circuit controlled by the switch from instantaneous overloads, a thermal responsive device connected to be heated in accordance with the current in the controlled circuit and connections whereby the said thermal device controls the energizing circuit of said electromagnet to effect the operation of the said switch member to protect the circuit controlled by the switch from continued relatively small overloads.

5. A circuit controller comprising a movable switch member, an electromagnet having a winding and a magnetic movable member biased to the unattracted position which when attracted cooperates with the said switch member to interrupt the controlled circuit in response to an overload greater than a predetermined value, a thermal responsive device connected to be heated in accordance with the current in the circuit to be controlled, and connections whereby the said device controls the energizing circuit of said electromagnet to attract the magnetic member at a smaller value of current in the controlled circuit depending on the heating effect of the current in the controlled circuit.

In witness whereof, I have hereunto set my hand this 16th day of July, 1923.

WALTHER BÜRSTYN.